Dec. 20, 1949 S. HILLER, JR 2,491,733
HELICOPTER
Filed Nov. 25, 1946 5 Sheets-Sheet 1
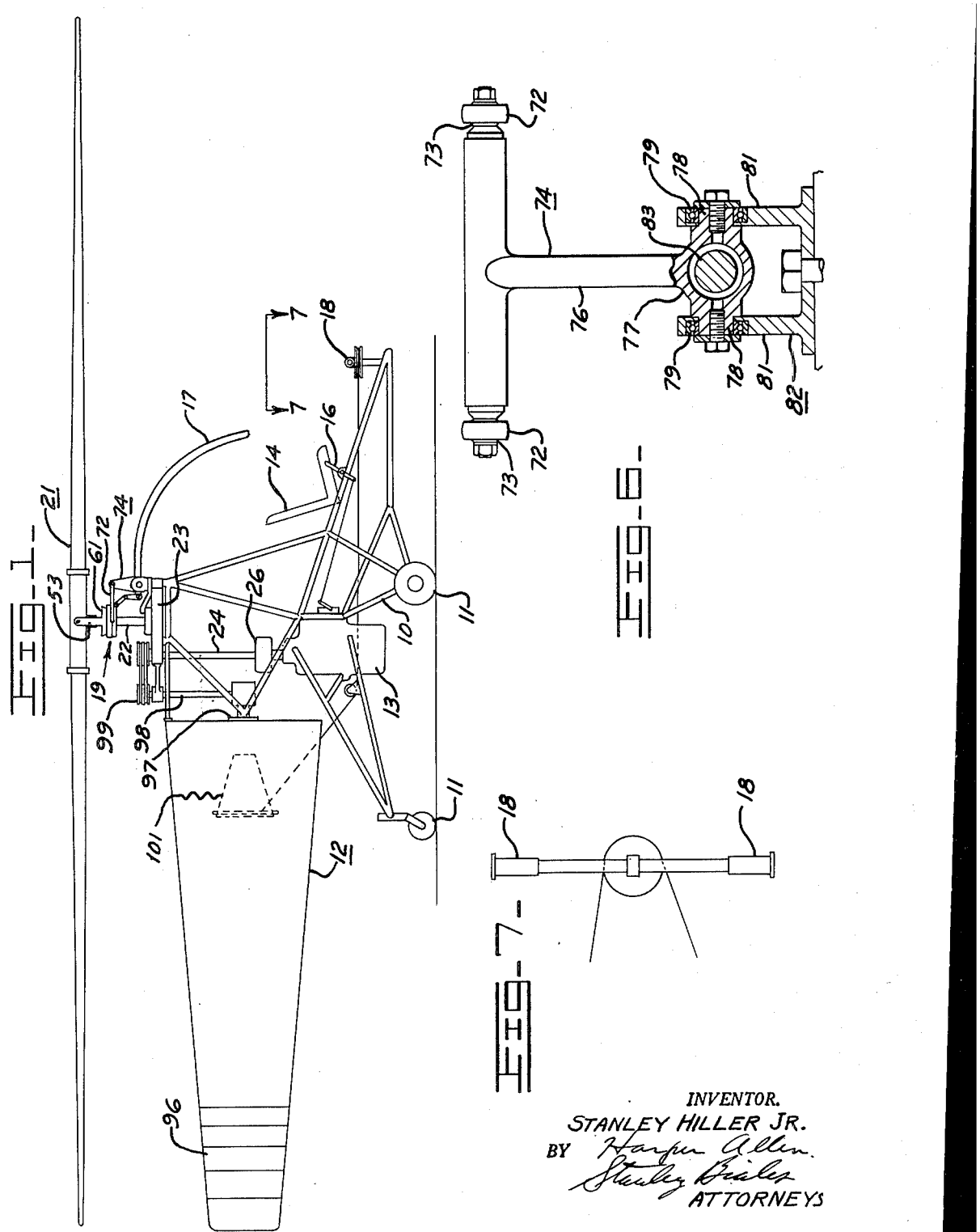
INVENTOR.
STANLEY HILLER JR.
BY Harper Allen
Stanley Bieler
ATTORNEYS

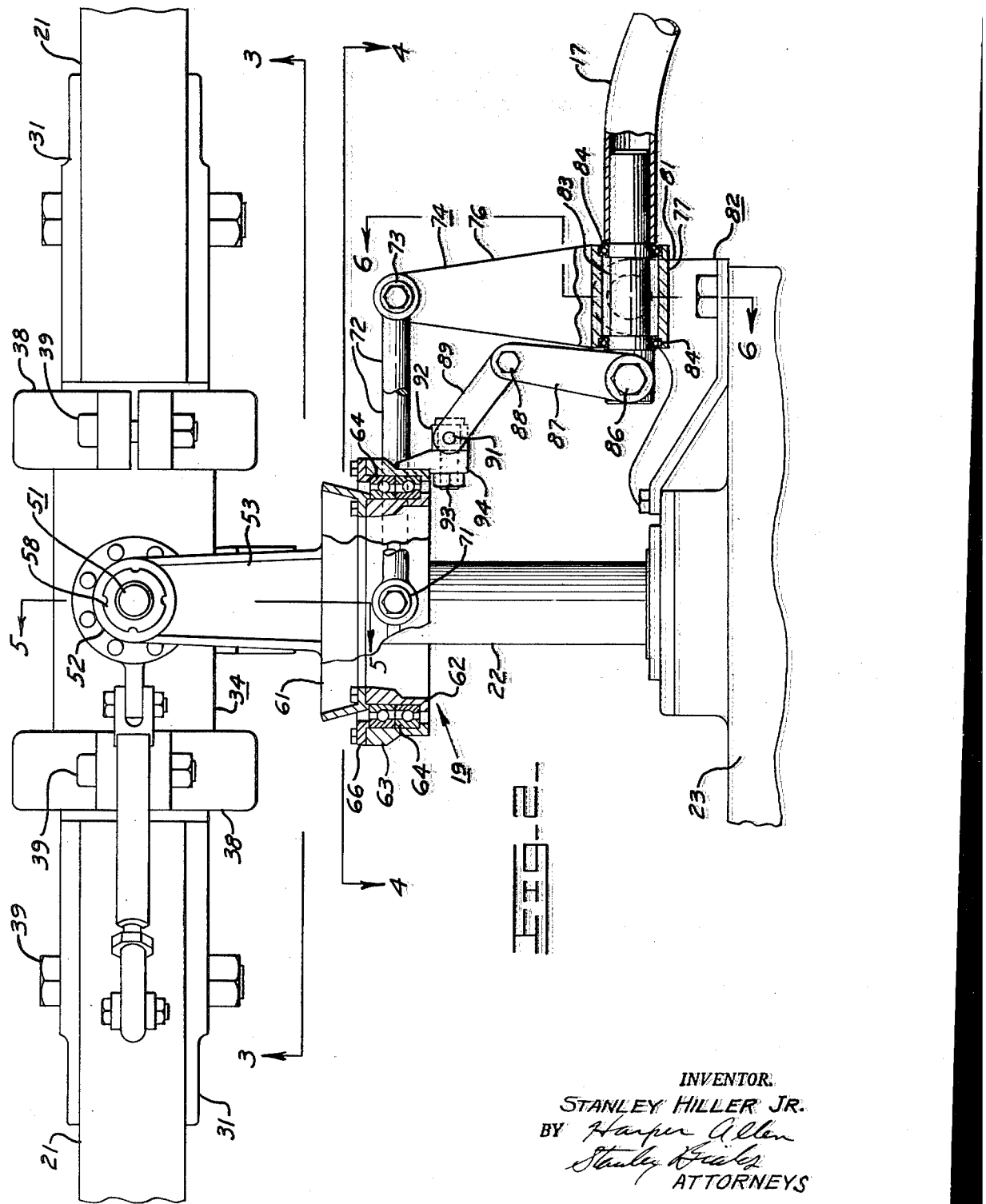

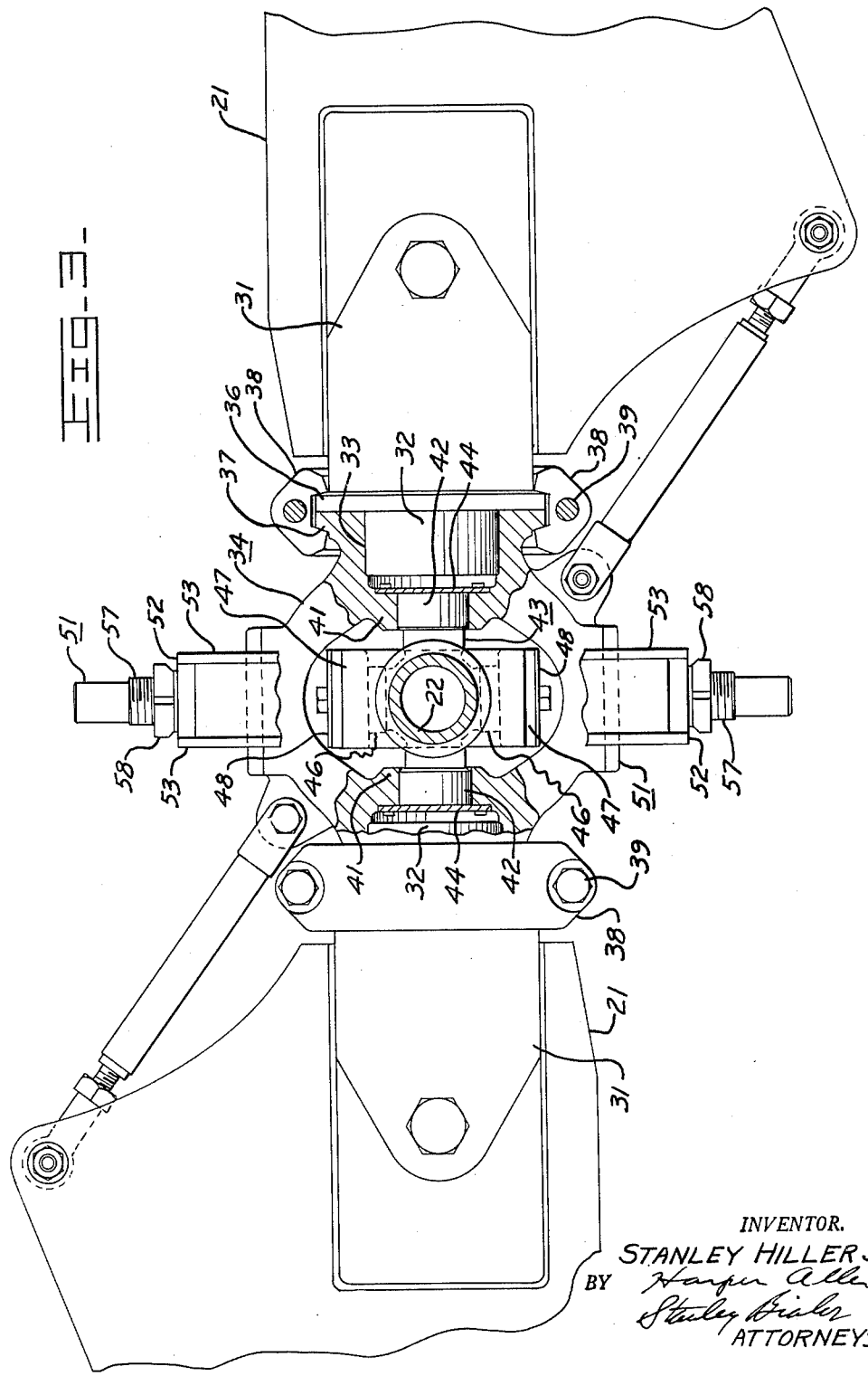

Dec. 20, 1949 S. HILLER, JR 2,491,733
HELICOPTER
Filed Nov. 25, 1946 5 Sheets-Sheet 4

INVENTOR.
STANLEY HILLER JR.
BY
ATTORNEYS

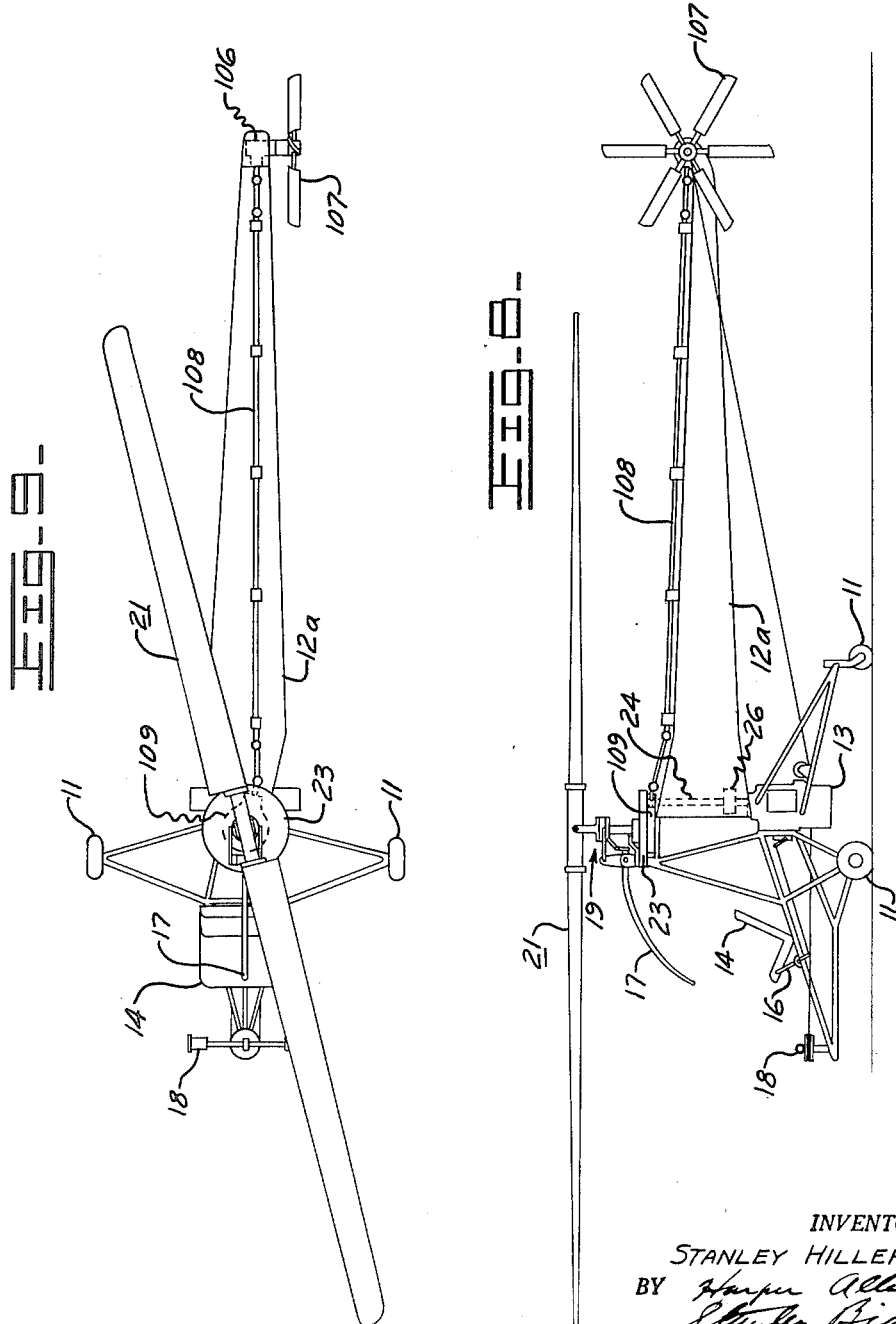

Patented Dec. 20, 1949

2,491,733

UNITED STATES PATENT OFFICE 2,491,733

HELICOPTER

Stanley Hiller, Jr., Menlo Park, Calif., assignor to United Helicopters, Inc., Palo Alto, Calif., a corporation of California Application November 25, 1946, Serial No. 712,182

6 Claims. (Cl. 170—160.26)

1

This invention relates to helicopters and is concerned more particularly with the provision of an improved helicopter of the single wing type having an advantageous mounting for the wing structure and providing simplified control means for the wing structure in maneuvering the aircraft.

It is a general object of the invention therefore to provide an improved helicopter.

Another object of the invention is to provide an improved helicopter of the single wing type in which directional control of the helicopter can be exercised by controlling rolling of the wing structure about its longitudinal axis to change the effective pitch thereof.

A further object of the invention is to provide a helicopter of the above type in which a single control stick can be employed to effect directional operation of the craft.

Other objects and advantages of the invention will be apparent from the following description of a preferred embodiment thereof as illustrated in the accompanying drawings, in which:

Figure 1 is a schematic side elevational view of a helicopter embodying the instant invention.

Figure 2 is an enlarged view of the drive head and control structure for the helicopter with certain parts shown in section.

Figure 3 is a bottom plan view of the universal mounting for the wing structure with certain parts shown in section taken as indicated by the line 3—3 in Figure 2.

Figure 6 is a fragmentary sectional view of a part of the control linkage taken as indicated by the line 6—6 in Figure 2.

Figure 7 is a fragmentary plan view of the foot pedal control means.

Figure 8 is a side elevational view of a helicopter employing a tail propeller for torque compensation.

Figure 9 is a plan view of the helicopter shown in Figure 8.

Figure 5:
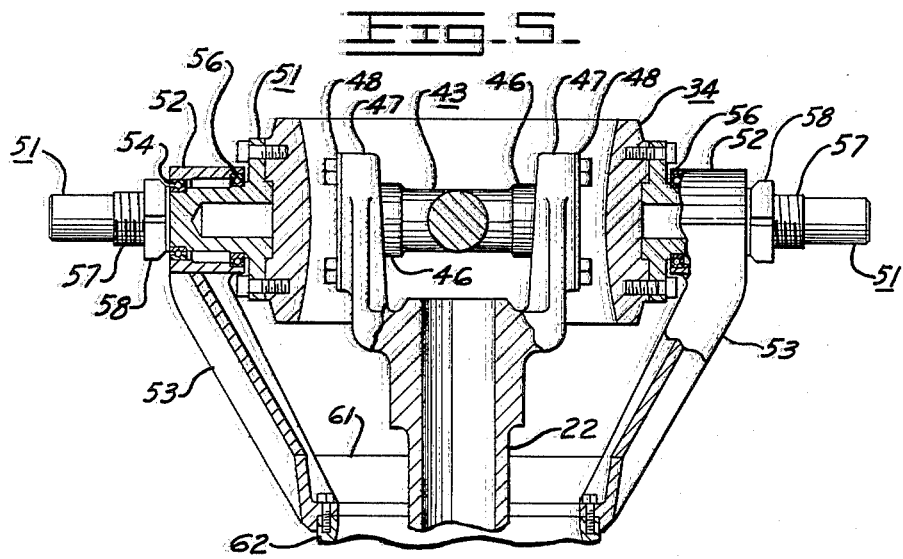
Figure 5 is a vertical sectional view through the drive head structure illustrating the mounting of the wing structure thereon and is taken as indicated by the line 5—5 in Figure 2.

Referring to Figure 1, there is illustrated a helicopter including a body or frame 10 formed of tubular struts having landing gear 11 thereon. Included in the body structure is a fuselage or tunnel 12 suitably supported upon the framework 10. The helicopter includes also a power plant or internal combustion engine 13 located immediately rearwardly of an operator's compartment including a seat 14, a throttle control 16 for the engine, a directional control stick 17, referred to hereinafter, and a pair of foot pedals 18. Also, a drive head structure 19 is provided which carries the wing structure 21, as described hereinafter. The drive head structure also includes a drive shaft 22 which is driven through a gear mechanism 23, a drive shaft 24, and a clutch 26 from the engine 13.

The wing structure 21 of the helicopter is mounted for controlled tilting movement about two axes at right angles to each with one of these axes containing a longitudinal axis of the wing structure.

Referring to Figures 2, 3 and 5, the two wing sections of the wing structure are each clamped at their inner ends between bracket extensions 31 of a mounting post or stub shaft 32 which is seated in an annular recess 33 of the supporting hub 34. The mounting shaft 32 is provided with an annular flange 36 mating with a similar flange 37 of the supporting hub 34 to receive opposite clamping brackets 38 having securing and clamping bolts 39 associated therewith, thus fixedly securing both wing sections of the wing structure to such central hub member 34. The supporting hub 34 is provided with opposite bosses 41 apertured to receive opposite trunnions or bearing portions 42 of a cross-shaped universal support element 43, which bearing portions 42 provide a pivotal mounting axis for hub 34 and consequently support both the wing sections of the wing structure for rolling together about a longitudinal axis thereof for cyclic pitch control. The positioning of the support element 43 with respect to the hub 34 is maintained by suitable retaining plates 44 secured across the outer portions of the bosses 41 thereof.

The cross-shaped supporting element 43 (Figures 3 and 5) is also provided with opposite shorter trunnions or bearing portions 46 which are journalled in opposite bosses 47 of a forked extension of the drive shaft 22. The trunnions 46 have their axis at a right angle to the axis of trunnions 42. Hence, hub 34 can rock or tilt on the forked extension of the drive shaft about an axis at a right angle to the axis of trunnions 42. As a result this provides for teetering or tilting of the wing structure about an axis transverse to its rolling or longitudinal axis, so that the wing structure can assume a plane of rotation determined by the cyclic pitch effected by rolling of the wing structure about its longitudinal axis. Retaining plates 48 are secured to the bosses 47 to maintain the position of the bearing portions 46 with respect to the bosses 47.

It is seen from the above description that the wing structure is mounted for universal tilting movement at the upper end of the drive shaft and that the universal mounting is encompassed by the wing structure and has its pivotal axes substantially coincident with the general plane of the wing structure. It will be noted that end-to-end or longitudinal tilting of the wing can take place about the trunnions 46, while rolling of the wing structure about its axis or pitch control of the wing can take place about the trunnions 42.

To effect control of the movement of the wing structure with reference to its pitch controlling mounting, the hub 34 has secured thereon opposite trunnions 51 which in the position of Fig. 5 are coaxial with the trunnions 46 of the universal support element 43. The trunnions 51 have journalled thereon for free suspension the bosses 52 of a pair of downwardly extending control arms 53 by means of suitable bearings 54 and 56. The reduced end of the trunnion 51 is threaded at 57 to receive a clamping nut 58 by means of which the bearings 54 and 56 and the boss 52 of each assembly are held in place on the associated trunnion 51. The depending arms 53 are integrally formed with a ring section 61 of the wobble mechanism 19 which is secured by suitable cap screws on the rotatable inner part or ring 62 of the wobble mechanism about which the stationary outer part or ring 63 is journalled by bearings 64. Both, the ring section 61 and a retaining ring 66, serve to maintain the bearings in place.

It is to be noted that the entire wobble mechanism surrounds the drive shaft 22 with clearance and free of engagement therewith, and that the inner ring 62 of the wobble mechanism is connected to the hub 34 of the wing structure by a simple connection comprising control arms 53 rigid with ring 62 but pivoted to hub 34 on an axis at a right angle to the rolling axis 42 for pitch adjustment of the wing structure. Since such rolling axis 42 and the pivotal axis of connection of arms 53 to hub 34 are fixed with reference to the hub, these axes will always lie in a common plane.

As previously stated, in general, the control stick 17 is connected to the wobble mechanism 19 to exert a tilting effect thereon in both a fore and aft direction, or in a lateral direction at right angles to the fore and aft direction, or in any desired combination of these directions. To effect the fore and aft adjustment of the wobble mechanism the outer part or ring 63 thereof is provided with opposite universal-type trunnions or pivots 71 on which the ends of respective control links 72 are pivotally secured. The forward ends of links 72 are pivotally secured on universal-type trunnion or pivot portions 73 of the horizontal transverse bar of a T-shaped link 74 whose vertical leg 76 (Figures 2 and 6) is provided with an apertured boss 77 having its axis extending in a fore and aft direction. The boss 77 has a pair of opposite laterally extending trunnions 78 journalled by respective bearings 79 in the upstanding arms 81 of a mounting bracket 82 on the frame of the helicopter. The mounting of the trunnions 78 and the connection of each end of the transverse bar of the T-shaped link 74 to the stationary outer ring of the wobble mechanism holds the outer ring of the wobble mechanism against rotation and consequently absorbs the rotational thrust imparted to the outer ring by the rotatable inner ring of the wobble mechanism, to make the control stick 17 more stable, particularly in extreme adjusted positions thereof. As seen in Figure 2, a shaft portion or end 83 of the control stick 17 is journalled by bearings 84 within the boss 77 so that fore and aft movement of the control stick 17 will cause pivoting movement of the control link 76, fore and aft movement of the connecting links 72 and consequently fore and aft tilting of the wobble mechanism 19. The effect of such fore and aft tilting of the wobble mechanism is to cause forward or rearward movement, respectively, of the helicopter. In this connection, it is to be observed that linkage 72, 76 provides a reversing linkage to impart proper directional control to the wing structure through the wobble mechanism, so that movement of the stick forwardly will cause forward movement of the ship and vice versa.

Figure 4:
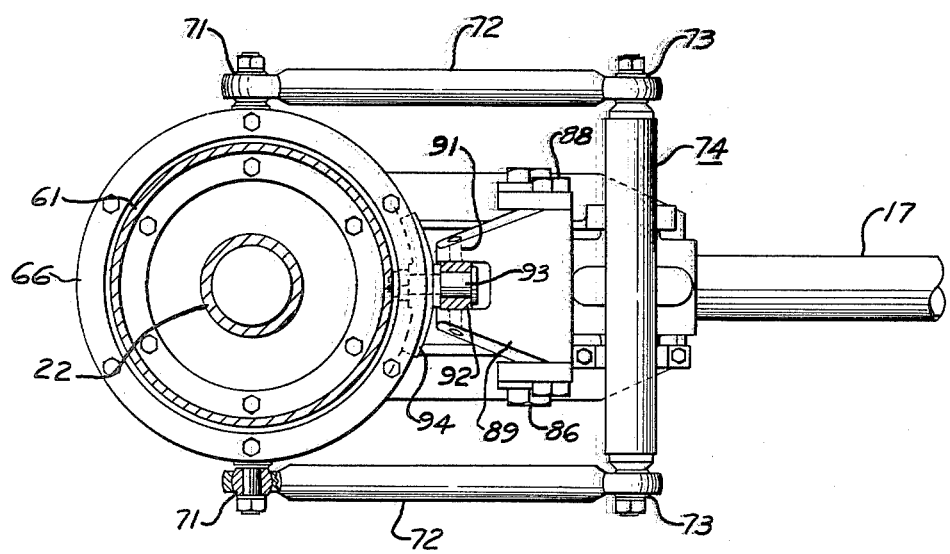
Figure 4 is a sectional plan view of the wobble mechanism and controlling linkage therefor taken as indicated by the line 4—4 in Figure 2.

In order to control lateral movement of the wobble mechanism, the shaft portion 83 of the control stick 17 is provided with a transverse pivot stud or bolt 86 on which respective parallel vertically extending links 87 have their lower ends pivoted. The upper ends of the links 87 are pivotally connected, respectively, at 88 to a V-shaped link 89 forming with the links 87 a toggle mechanism. The upper end of the V-shaped link 89 (Figures 2 and 4) is forked for pivoting at 91 on a pivot block 92, which pivot block is journalled about a fore and aft axis on a stud 93 pivoted in a depending mounting bracket 94 on the outer part 63 of the wobble mechanism. As a result, when the control stick is moved laterally with turning of shaft portion 83 in bearings 84, lateral tilting of the wobble mechanism is effected. In this connection, the previously described links 72 prevent the outer ring of the wobble mechanism from revolving when a lateral control of the stick is effected.

The turning of a helicopter body about the vertical drive axis and the torque compensation for the wing structure may be carried out in any convenient manner, for example, as disclosed in my copending application, Serial No. 712,181, filed November 25, 1946, for Helicopters, issued as Patent No. 2,481,749, dated September 13, 1949, and will only briefly be described herein.

The fuselage 12 (Figure 1) provides a gas tunnel and terminates in a laterally projecting rear opening 96 for directing a gas or air jet laterally in a direction to resist the torque reaction of the wing structure 21. The jet of air is provided by suitable means such as a propeller 97 driven through a drive shaft 98 and a pulley drive mechanism 99 from the drive shaft 24. One lateral wall of the tunnel 12 is provided with a by-pass valve or flap 101 by means of which a portion of the air jet can be by-passed so that by partially opening or closing this by-pass valve, as disclosed in the above application, turning of the body can be controlled from the foot pedals 18.

Figures 8 and 9 illustrate a helicopter employing the directional movement control of the instant invention in conjunction with a tail propeller for torque compensation and turning control of the helicopter. In this modification, the body structure includes a fuselage 12a formed of tubular struts and braces having a mounting at the tail for a gear box 106 which carries a tail propeller 107 of the variable pitch type. The gear box 106 is driven from the engine 13 through suitable tubular shafting 108 and a gear box 109. To control turning of the helicopter, the variable pitch control means for the tail propeller 107 is connected by a conventional cable mechanism to the foot pedals 18. Otherwise the structure of the helicopter shown in Figures 8 and 9 is the same as described in connection with Figures 1 to 7.

As previously described, vertical ascent and descent of the helicopter is controlled by the engine throttle 16.

Before describing the operation and maneuvering of the helicopter in fore and aft or sidewise directions by use of the control stick 17, certain structural features of the wing mounting and its relation to such control will be reviewed. It will be recalled that the wing is mounted for longitudinal end to end tilting or teetering movement about an axis (defined by bearings 46) transverse to its longitudinal or rolling axis (defined by bearings 42), the bearings 46 providing the direct support therefor on the drive shaft, and that there is no direct controlling connection of any sort to the wing to adjust this end to end tilting movement. Thus, end-to-end tilting movement of the wing is a function entirely of the aerodynamic and gyroscopic forces, to which the wing is subjected in a controlled fashion, as will be described. The adjustment of the wing about its longitudinal axis, i. e., the pitch control or rolling of the wing, can be controlled from its pivotal connection to the wobble mechanism because as the plane of the wobble mechanism is adjusted by the control stick, the connecting arms 53 from the wobble mechanism to the hub 34 of the wing structure cause the hub 34 to pivot about the wing rolling axis at 42. Since the wing structure is fixed to hub 34, the pitch of the wing section must change about such axis 42 for cyclic pitch control dependent on the plane of inclination of the wobble mechanism from the neutral. It is the pitch adjustment of the wing structure that automatically determines the end to end tilting or teetering adjustment of the wing structure about the axis at 46 for fixing the plane of rotation of the wing structure for directional control. Further, it is to be noted that the stationary outer part of the wobble mechanism can be adjusted in a universal tilting fashion from the control stick 17 so that as the inner part of the wobble mechanism rotates the rolling of the wing about its longitudinal axis or its pitch will be varied continuously through each revolution.

Turning first to the fore and aft movement of the control stick 17, to produce forward or rearward movement of the helicopter, adjusting movement of the stick causes a tilting of the disk or plane of rotation of the wing structure either forwardly or rearwardly. Assuming the control stick 17 to have been moved forwardly to tilt the wobble mechanism clockwise from its position shown in Figure 2 and with the wing in the position shown, no effect is exerted on the wing because the wobble mechanism merely tilts about the transverse axis of the wing. However, with the wing structure rotating in a direction clockwise as viewed from above and its entire universal mounting and the control connections to the wobble mechanism rotating therewith, the pitch of the wing namely, its angle of attack effected by adjustment of the entire wing structure about its rolling axis at 42 is gradually changed with a maximum pitch adjustment when the wing is extending transversely of the helicopter, i. e., at right angles to the position as shown in Figure 2. As a result of this pitch adjustment, the forwardly moving wing section receives its minimum pitch adjustment at this point and the rearwardly moving wing section receives its maximum pitch adjustment. Thus, at this point, considering the wing as a gyroscopic body, a force is exerted about one pivotal axis of movement thereof which will result in a precessional movement of the gyroscopic body about an axis at right angles to the axis of the force. The actual dipping or tilting of the wing section in response to this adjustment of the control stick will reach a maximum at a position 90° from where the controlling force was exerted, i. e., in a forward direction; and the resultant tilted position of the entire wing structure will be in a plane parallel to the plane of the wobble mechanism until the wobble mechanism is again adjusted by the control stick for further directional control. With the plane of the disk of rotation tilted forwardly, as is well known, the helicopter will move forwardly.

The above explanation is made with reference to the position shown in Fig. 2 and on the assumption that stick 17 is moved only forwardly. By movement of the control stick in any other direction, either rearwardly, or laterally in either direction, or with combined lateral and fore or aft movements, the wobble mechanism can be adjustably tilted to any desired plane. Such other tilting adjustments of the wobble mechanism by the stick 17 will correspondingly exert a controlling force on the wing to control the points of maximum and minimum pitch adjustment of the wing sections, and to cause a dip of the wing sections as they arrive at the desired direction of travel in response to the position of the control stick.

While I have shown certain preferred embodiments of the invention, it will be apparent that the invention is capable of further variation and modification and its scope should be limited only by the scope of the claims appended hereto.

I claim:

1. In a helicopter having a body and a drive head structure including a non-tiltable drive shaft projecting upwardly therefrom, a wing structure, mounting means for said wing structure including a universal element pivotally mounted on said drive shaft about an axis at right angles to the wing structure for end to end tilting movement of said wing structure and pivotally connected to said wing structure about an axis coincident with the longitudinal axis of said wing structure for pitch adjustment of said wing structure, trunnions on said wing structure having their axes transverse to such pitch adjustment axis, an annular control member having upward extensions journalled about said trunnions, a control ring having a journalled connection with said control member, a controlling connection to said control ring pivotally connected thereto about an axis at right angles to the fore and aft axis of the helicopter and including an upright member mounted for pivotal movement about a similar transverse axis, a control linkage connected to said control ring along a fore and aft axis of the helicopter, and a control stick having a member provided with a journalled connection in said upright member along such fore and aft axis and connected to said linkage to effect lateral movement thereof upon turning of said control stick member in said journalled connection, said journalled connection of said control stick member in said upright member also enabling fore and aft tilting movement of said upright member upon fore and aft movement of said control stick whereby said control stick is operable through both said control linkage and said controlling connection to exert a tilting effect in any direction on said wing structure to control directional flight of the helicopter.

2. In a helicopter, an upright drive shaft; a wing structure including a support member; means mounting said wing structure on said drive shaft comprising a universal connection between said support member and said drive shaft enabling pivotal movement of said wing structure about an axis extending generally longitudinally of said wing structure for cyclic pitch adjustment of said wing structure and end to end tilting movement of said wing structure about a second axis transverse to said pitch adjustment axis; adjustable wobble mechanism about said drive shaft comprising a rotatable ring and a non-rotatable ring on which said rotatable ring is journalled; connecting means between said wobble mechanism and said wing structure to effect cyclic pitch adjustment of said wing structure determined by the plane of adjustment of said wobble mechanism including diametrically opposite arms extending from said rotatable ring and to said support member at spaced points on a line transverse with respect to said pitch adjustment axis; and control means for effecting adjustment of said wobble mechanism including a pilot operable control member, a linkage including an upright link member pivotally mounted on the helicopter for fore and aft tilting movement about an axis transverse to the fore and aft axis of the helicopter and spaced link members universally connected to said upright link member and universally connected to said non-rotatable ring at diametrically opposite points along a transverse axis, said pilot operable control member being provided with a journalled connection in said upright link member along a fore and aft axis whereby fore and aft movement of the pilot operable control member results in fore and aft tilting of said upright link member and said wobble mechanism, and a second linkage pivotally connected to said pilot operable control member and universally connected to said non-rotatable ring whereby turning of said control member in said journalled connection effects lateral tilting of said second linkage and said wobble mechanism.

3. In a helicopter, an upright drive shaft; a wing structure including a support member; means mounting said wing structure on said drive shaft comprising a universal connection between said support member and said drive shaft enabling pivotal movement of said wing structure about its longitudinal axis for cyclic pitch adjustment of said wing structure and end to end tilting movement of said wing structure about a second axis transverse to said pitch adjustment axis; adjustable wobble mechanism about said drive shaft comprising an inner rotatable ring and an outer non-rotatable ring in which said inner ring is journalled; connecting means between said wobble mechanism and said wing structure to effect cyclic pitch adjustment of said wing structure determined by the plane of adjustment of said wobble mechanism, including a pair of diametrically opposite arms rigidly connected to said rotatable ring and pivotally connected to said support member on an axis transverse to said pitch adjustment axis; said arms suspending the entire wobble mechanism from said support member; and control means for effecting adjustment of said wobble mechanism including mechanism for holding said outer ring against rotation.

4. In a helicopter, an upright drive shaft; a wing structure including a support member; means mounting said wing structure on said drive shaft comprising a universal connection between said support member and said drive shaft enabling pivotal movement of said wing structure about its longitudinal axis for cyclic pitch adjustment of said wing structure and end to end tilting movement of said wing structure about a second axis transverse to said pitch adjustment axis; adjustable wobble mechanism about said drive shaft comprising an inner rotatable ring surrounding said drive shaft and free of connection thereto and an outer non-rotatable ring in which said inner ring is journalled; connecting means between said wobble mechanism and said wing structure to effect cyclic pitch adjustment of said wing structure determined by the plane of adjustment of said wobble mechanism including a pair of diametrically opposite arms rigidly connected to said rotatable ring and pivotally connected to said support member on an axis transverse to said pitch adjustment axis; said arms providing the sole support for said wobble mechanism on said support member; and control means for effecting adjustment of said wobble mechanism including mechanism for holding said outer ring against rotation.

5. In a helicopter, an upright non-tiltable drive shaft; a wing structure including a central hub member and wing sections extending from diametrically opposite points on said hub member; means universally mounting said wing structure on said drive shaft comprising a forked extension at the upper end of said drive shaft, a cross-shaped universal support element upon which said hub member is journalled along one axis of said element coincident with said opposite points for pivotal movement of said wing structure about its longitudinal axis to enable cyclic pitch adjustment of said wing structure, said cross-shaped element being journalled in said forked extension about a second axis transverse to said pitch adjustment axis for end to end tilting movement of said wing structure; adjustable wobble mechanism about said drive shaft comprising an inner rotatable ring surrounding said drive shaft and free of connection thereto and an outer non-rotatable ring in which said inner ring is journalled; connecting means between said wobble mechanism and said wing structure to effect cyclic pitch adjustment of said wing structure determined by the plane of adjustment of said wobble mechanism including a pair of diametrically opposite arms rigidly connected to said rotatable ring and pivotally connected to said central support member on an axis transverse to said pitch adjustment axis; said arms providing the sole support for said wobble mechanism on said central support member; and control means for effecting adjustment of said wobble mechanism including mechanism for holding said outer ring against rotation.

6. In a helicopter, the combination with wobble mechanism for effecting cyclic pitch control of a wing structure and including a rotatable ring and a non-rotatable ring about said rotatable ring; of control means for effecting adjustment of said wobble mechanism comprising a pilot operable control member, a linkage including an upright link member pivotally mounted on the helicopter for fore and aft tilting movement about an axis transverse to the fore and aft axis of the helicopter and spaced link members universally connected to said upright link member and universally connected to said non-rotatable ring at diametrically opposite points along a transverse axis, said pilot operable control member being provided with a journalled connection in said upright link member along a fore and aft axis whereby fore and aft movement of the pilot operable control member results in fore and aft tilting of said upright link member and said wobble mechanism, and a second linkage pivotally connected to said pilot operable control member and universally connected to said non-rotatable ring whereby turning of said control member in said journalled connection effects lateral tilting of said second linkage and said wobble mechanism.

STANLEY HILLER, Jr.

REFERENCES CITED

The following references are of record in the file of this patent:

UNITED STATES PATENTS

| Number | Name | Date |
|---|---|---|
| 1,701,762 | Pitcairn | Feb. 12, 1929 |
| 1,828,783 | Oehmichen | Oct. 27, 1931 |
| 2,023,105 | Smith | Dec. 3, 1935 |
| 2,030,578 | Flettner | Feb. 11, 1936 |
| 2,153,610 | Campbell | Feb. 6, 1939 |
| 2,256,918 | Young | Sept. 23, 1941 |
| 2,271,473 | Bennett | Jan. 27, 1942 |
| 2,368,698 | Young | Feb. 6, 1945 |
| 2,404,014 | Thornes | July 16, 1946 |

FOREIGN PATENTS

| Number | Country | Date |
|---|---|---|
| 14,455 | Great Britain | June 15, 1910 |
| 595,988 | Great Britain | Dec. 24, 1947 |